Patented Oct. 2, 1923.

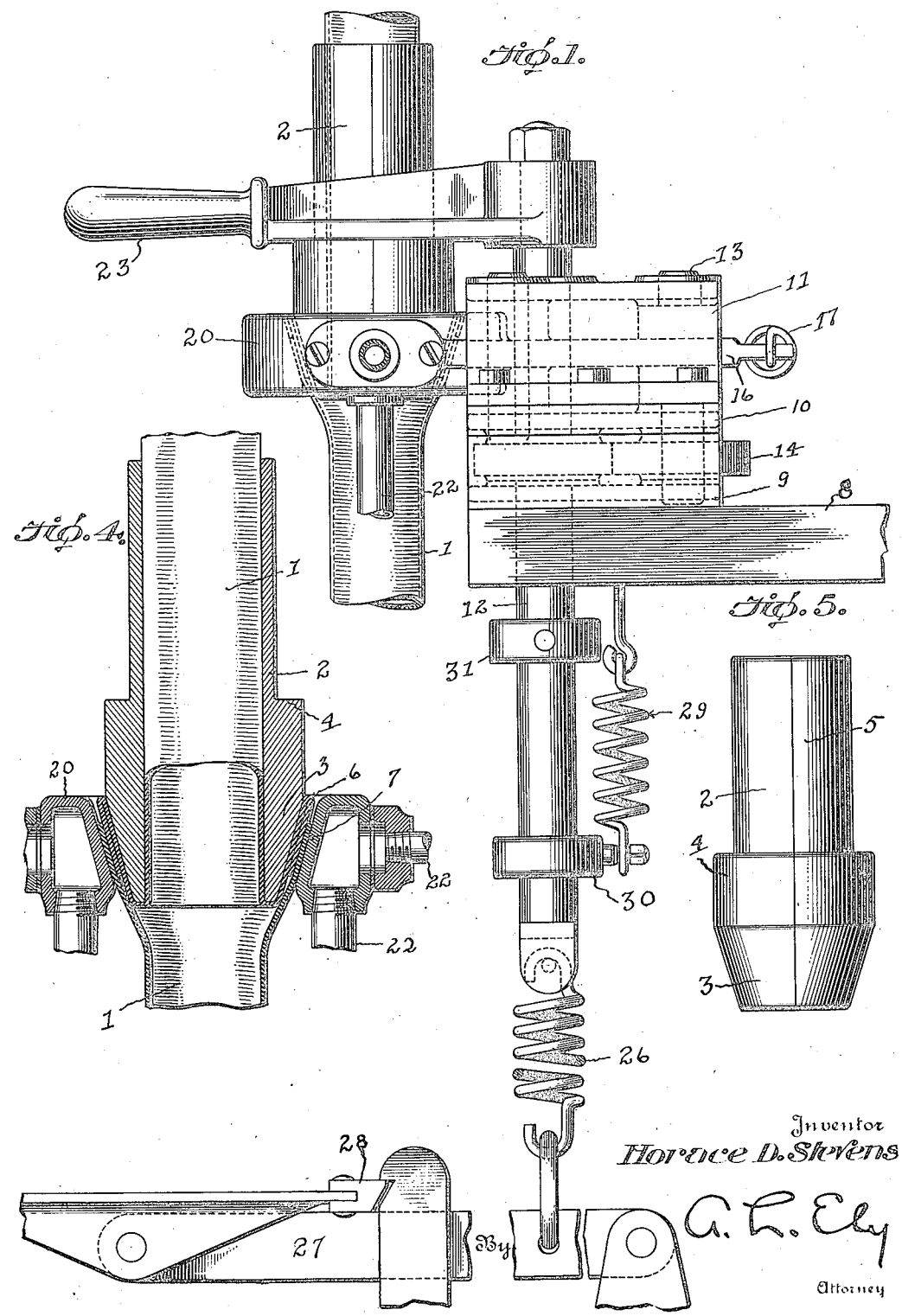

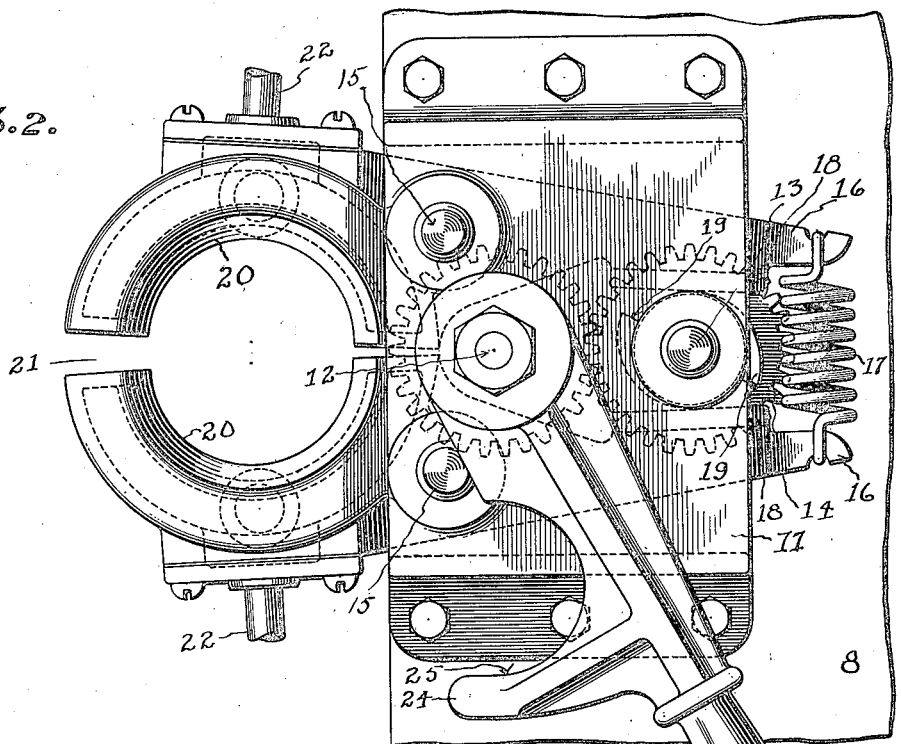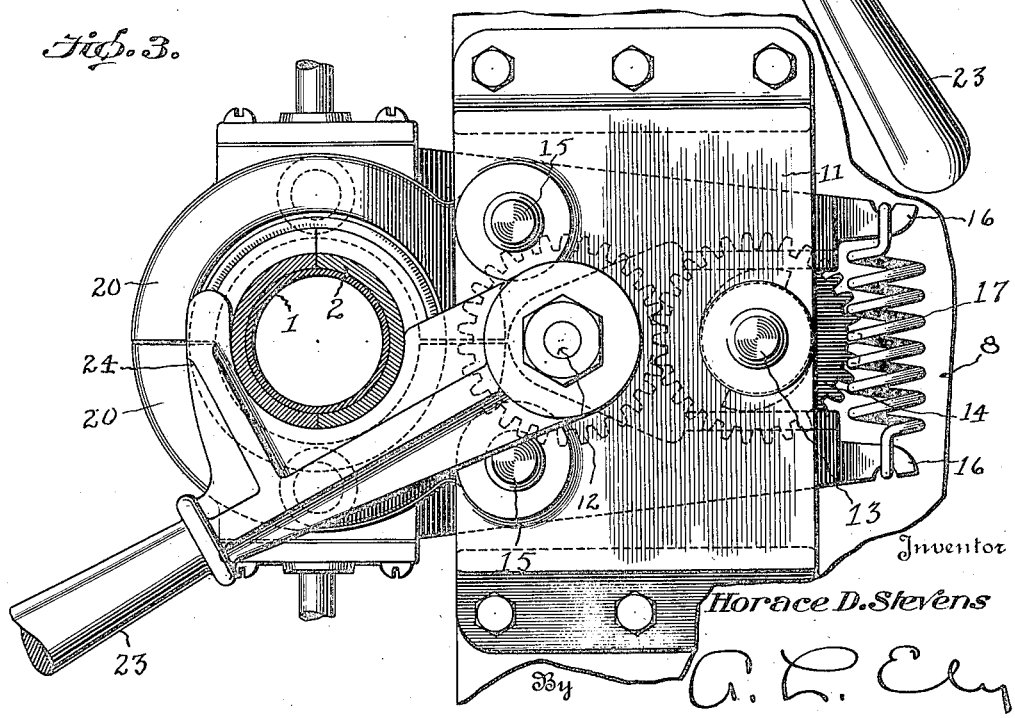

1,469,342

UNITED STATES PATENT OFFICE.

HORACE D. STEVENS, OF AKRON, OHIO, ASSIGNOR TO THE FIRESTONE TIRE AND RUBBER COMPANY, OF AKRON, OHIO, A CORPORATION OF OHIO.

METHOD AND APPARATUS FOR VULCANIZING INNER-TUBE SPLICES.

Application filed June 26, 1922. Serial No. 571,028.

*To all whom it may concern:*

Be it known that I, HORACE D. STEVENS, a citizen of the United States, and a resident of Akron, in the county of Summit, State of Ohio, have invented certain new and useful Improvements in Methods and Apparatus for Vulcanizing Inner-Tube Splices, of which the following is a specification.

This invention relates to a method and apparatus for use in curing the splice which occurs in the manufacture of inner tubes. Various methods and apparatus have been used for curing splices on inner tubes, but they have been more or less uncertain and unsatisfactory. The object of my invention is to construct a simple and easily operated device by which the splice on the inner tube may be vulcanized by heat.

These and other objects will appear as the description and drawings are understood, it being the purpose of this application to make clear the invention, without restricting the scope of the invention beyond the limitations of the prior art and of the claims hereto appended.

In the drawings:

Figure 1 is a side elevation of my improved splice curing apparatus showing a fragment of the tube in place;

Figure 2 is a plan showing the apparatus open;

Figure 3 is another plan showing the apparatus closed and the tube in position in section;

Figure 4 is a longitudinal section through the mandrel;

Figure 5 is a view of the mandrel.

In the manufacture of inner tubes, they are constructed as straight or curved hollow tubes and after being cured are joined at their ends. For a considerable period this has been done by forming cuffs on the ends of the tubes and bringing them together with considerable surface in contact, whereupon the joint has been vulcanized either by acid or by the application of heat. In the practice of my invention I have utilized the old and well known form of cuff and mandrel and provided a type of apparatus in which the tube splice may be cured and in which it will be kept under continuous pressure between relatively unyielding surfaces.

In the drawings the inner tube is indicated by the numeral 1. About one end of the tube is placed a mandrel shown here by the numeral 2. This mandrel is split in two parts as shown in Figures 3 and 5, so as to be receivable over the tube, and is formed with a tapered head 3 above which is located a shoulder 4. The remainder of the mandrel 5 may be used for a handle. Part or all of the mandrel may be made of wood so as to be heat insulating, in order that it may be easily handled by the operator.

The tube is formed with the usual double cuff 6 on the tapered portion, the other end of the tube 7 being forced over the outer surface of the cuff by the usual blower, as is well understood in the art, the contacting surfaces of the tube being buffed and cemented.

On the edge of a table or other suitable support 8 is secured the vulcanizing apparatus which is at a sufficient height above the floor to enable the tube to hang in position. To the table 8 is secured a base plate 9, the center of which is recessed and over which is secured a center plate 10 to which is attached an inverted channel-shaped cap plate 11.

Passing through the several plates is an elongated vertical operating shaft 12 and a shorter shaft 13, which will be called the cam-shaft. These two shafts are connected together for rotation by a pair of intermeshing gears 14. In the center and cap plates are located two parallel vertical shafts 15 which serve as pivots for two swinging arms 16, which are drawn together at their rear ends by a spring 17. The facing surfaces of the arm 16 are provided with wear plates 18, which are arranged to be contacted by spreading cams 19 carried on the cam-shaft 13.

The forward ends of the arms 16 extend over the edge of the table as supports for hollow semi-circular heating chambers 20, which, when the arms are spread apart at their forward ends by the spring 17, will provide a slot 21 to permit the insertion of the tube. The inner surfaces of the chambers 20 are tapered as shown in Figure 4, closely paralleling the surface 3 of the mandrel. The steam chests are supplied by pipes 22 so as to be kept at a temperature sufficient to vulcanize the splice. When the tube is inserted, as shown in Figures 3 and 4, the splice is securely clamped.

In order to rotate the shaft 12, to force the cams into the position shown in Figure 3, an operating handle 23 is attached to the upper end of the shaft 12. On the side of the handle 23 is located a horn or finger 24, the inner surface of which is formed with a semi-circular recess 25. The handle 23 is so arranged on the shaft 12 that when it is swung around to position to move the steam chambers 20 into clamping position, the recess 25 will bear against the mandrel 2 just above the shoulder 4. This construction is for the purpose of enabling the spliced tube to be forced into the chamber to obtain the requisite pressure on the splice during the curing operation.

The action desired is obtained by mounting the shaft 12 for vertical reciprocation through the several bearing plates, making a feather connection with its gear 14. This shaft is extended below the table 8 and is attached by a coil spring 26 to a foot treadle 27. The treadle is provided with a suitable catch 28 by which it may be held in depressed position. A coil spring 29 is fastened to the under side of the table 8 and to a collar 30 on the shaft 12 and tends to raise the shaft 12 to its upper limit, which is determined by a set collar 31.

The operation will be readily understood from the description which has been given. A number of these vulcanizing apparatus are arranged along a table. The operator forms the cuff 6 over the mandrel 2 and projects the other end 7 of the tube over the cuff in the usual manner. The apparatus being open in the position shown in Figure 2, he passes the tube, in flattened condition, through the opening 21 and drops the mandrel into position between the steam chambers so that the splice is brought in contact with the heated surfaces. The handle 23 is then swung around until the chambers are closed together to form the full circular vulcanizer shown in Figure 3, which action also serves to bring the circular recess in contact with the mandrel. He then depresses the treadle 27 with his foot and the mandrel is forced downwardly into the curing space, the spring 26 serving to exert a strong yielding pressure on the splice so that a close and intimate contact is provided between the splice and the heated vulcanizing surface. The treadle is locked in its depressed position. During the period required for complete vulcanization, the operator is performing similar operations on other apparatus and when the splice is cured he releases the treadle 27, swings the handle 23 backwardly and removes the tube.

It is obvious that changes and modifications may be made without sacrificing any of the benefits of the invention, and such variations as may be made without departing from the essential features of the invention are intended to be covered in the appended claims.

What I claim is:

1. A method of vulcanizing inner tube splices comprising, supporting the splice between two rigid surfaces, exerting a yielding pressure on the splice, and heating the splice to vulcanize it.

2. A method of vulcanizing inner tube splices comprising, supporting the splice between two tapering surfaces, forcing the splice into the taper and holding it in that position, and applying heat to the splice while so held.

3. A method of vulcanizing inner tube splices comprising, supporting the splice between two rigid tapering surfaces, forcing the splice into the taper with yielding pressure, and applying heat to the splice while so held.

4. A method of forming inner tube splices comprising, supporting the splice between two rigid surfaces, exerting a yielding pressure on the splice, and vulcanizing the splice.

5. A method of forming inner tube splices comprising, supporting the splice between two tapering surfaces, forcing the splice into the taper and holding it in that position, and vulcanizing the splice while so held.

6. A method of forming inner tube splices comprising, supporting the splice between two rigid tapering surfaces, forcing the splice into the taper with yielding pressure, and vulcanizing the splice while so held.

7. An apparatus for forming inner tube splices comprising, a rigid mandrel for supporting the inner surface of the splice, a rigid surrounding member for the splice, and means to force the mandrel and the surrounding member together with yielding pressure.

8. An apparatus for forming inner tube splices comprising, a rigid mandrel having a tapering surface for supporting the inner surface of the splice, a rigid tapering surrounding member for the splice, and yielding pressure means to force the two surfaces together.

9. An apparatus for forming inner tube splices comprising, a rigid mandrel having a tapering end to support the inner surface of the splice, a heated chamber having a tapering recess, a mandrel engaging device, and a pressure member adapted to move the mandrel longitudinally of the chamber.

10. An apparatus for forming inner tube splices comprising, a rigid mandrel having a tapering end to support the inner surface of the splice, a heated chamber having a tapering recess, a mandrel engaging device, and a spring held pressure member adapted to move the mandrel longitudinally of the chamber.

11. An apparatus for forming inner tube splices comprising, a mandrel having a tapering end to support the inner surface of the splice, a two part heating chamber having a correspondingly tapered inner surface, an operating lever, and means connected with said lever adapted to engage one of said parts to move it toward the other.

12. An apparatus for forming inner tube splices comprising, a mandrel having a tapering end to support the inner surface of the splice, a two part heating chamber having a correspondingly tapered inner surface, an operating lever, means connected with said lever adapted to engage one of said parts to move it toward the other, and means associated with the lever to exert a yielding pressure on the parts.

13. An apparatus for forming inner tube splices comprising, a mandrel, a two part heating chamber, means to open and close said heating chamber, an operating lever, and means associated with the operating lever to force the mandrel and the chamber together.

14. An apparatus for forming inner tube splices comprising, a mandrel, a two part heating chamber, means to open and close said heating chamber, an operating lever, means associated with the operating lever to force the mandrel and the chamber together, and means to exert a yielding pressure on the splice.

HORACE D. STEVENS.